United States Patent [19]

Kageyama et al.

[11] 4,026,877

[45] May 31, 1977

[54] VULCANIZATION ACCELERATOR SYSTEM FOR RUBBER COMPOSITIONS

[75] Inventors: Kunio Kageyama, Yokohama; Hiroshi Hirakawa; Masatake Ozaki, both of Isehara; Iwao Sugiyama, Hiratsuka; Mitsuharu Iwakura, Hiratsuka; Yoshiaki Someya, Hiratsuka, all of Japan

[73] Assignee: The Yokohama Rubber Co. Ltd., Tokyo, Japan

[22] Filed: Oct. 24, 1975

[21] Appl. No.: 625,568

[30] Foreign Application Priority Data

Oct. 30, 1974 Japan .......................... 49-124433

[52] U.S. Cl. .......................... 260/79.5 P; 252/182; 260/79.5 A; 260/79.5 B; 260/784; 260/792; 260/793

[51] Int. Cl.² ..................... C08L 7/00; C08L 9/00; C09K 3/00

[58] Field of Search ............... 252/182; 260/79.5 P, 260/79.5 A, 79.5 B, 793, 784, 792

[56] References Cited

UNITED STATES PATENTS

| | | | |
|---|---|---|---|
| 1,652,101 | 12/1927 | Elley .................................. | 260/784 |
| 3,197,446 | 7/1965 | Ziarnik et al. ..................... | 260/793 |
| 3,869,435 | 3/1975 | Triuette ......................... | 260/79.5 P |

*Primary Examiner*—Ronald W. Griffin
*Attorney, Agent, or Firm*—Finnegan, Henderson, Farabow & Garrett

[57] ABSTRACT

Rubber compositions containing therein as a source of carbon disulfide at least one compound selected from the group consisting of cyclic bis (thiocarbamoyl) mono- or di-sulfides, cyclic bis (thioxanthogenyl) mono- or di-sulfides, and cyclic (thiocarbamoyl-thioxanthogenyl) mono- or di-sulfides and an amine-isocyanate addition compound as a vulcanization accelerator system having excellent scorching stability with rapid vulcanization at usual vulcanization temperatures.

22 Claims, No Drawings

VULCANIZATION ACCELERATOR SYSTEM FOR RUBBER COMPOSITIONS

This invention relates to a vulcanization accelerator system for rubber compositions and more especially to a vulcanization accelerator produced chemically in the rubber composition.

There are many established techniques for adding vulcanization accelerators to rubber to shorten the vulcanization time, to lower the vulcanization temperature, to improve various characteristics of the vulcanized rubber articles, and to improve the handling ability of the rubber during processing in vulcanization apparatus.

Vulcanization accelerators presently used in the industry, however, present many different problems. For example, dithioacid salts such as dithiocarbamates or thiurams, so called "ultra-accelerators", rapidly accelerate vulcanization at conventional vulcanization temperatures, but they have the problem of prematurely vulcanizing the rubber compositions during processing steps, such as mixing or molding, due to the heat generated by their own activity resulting in undesired scorching of the rubber. Sulfenamides, so called "delayed action accelerators", do not present scorching problems, but they tend to retard the rate of vulcanization.

In other words, known accelerators generally have scorching characteristics directly proportional to their rate of vulcanization.

Accordingly, it has become important in the rubber industry to find novel accelerator systems that prevent scorching of the rubber at processing temperatures but that allow vulcanization to take place rapidly at vulcanization temperatures.

There are methods in which the accelerator is stabilized and prevented from being released below some limited temperature in an attempt to satisfy these requirements for rubber vulcanization accelerator systems. In U.S. Pat. No. 1,511,984, for example, there is disclosed a method in which rubber is mixed with activated carbon adsorbed accelerator on the surface. Also, there is known an accelerator system in which rubber is mixed with barium trithiocarbonate which decomposes during heating to isolate carbon disulfide, and some kind of an amine together with sulfur, zinc oxide and other ingredients. Dithiocarbamic acid is then produced by heating to carry out the vulcanization.

These accelerator systems, however, tend to release accelerator or some active component even at the temperatures used during processing of rubber and, as a result, their scorching characteristics have not been significantly improved.

More recently, a method has been proposed (Japanese P. Tokkai Sho 47-42850) in which polythiocarbonate, which releases carbon disulfide during heating, and an amine or imine blocked with isocyanate, which releases amine or imine during heating, are mixed in the rubber composition so as to produce dithiocarbamic acid at the vulcanization temperature. However, polythiocarbonate used in this system has a decomposition temperature only slightly higher than the temperature used in the processing step and, consequently, its thermal stability is not good and vulcanization tends to gradually take place during the processing step.

An object of the present invention, therefore, is to overcome the problems created by these conventional techniques.

A further object of this invention is to provide a vulcanization accelerator system in which scorching does not take place for a long period of time at the temperatures encountered during processing of the rubber but that achieves rapid vulcanization at vulcanization temperatures.

These objects are achieved by the present invention by providing a rubber composition containing an "in situ" vulcanization accelerator system comprising essentially two components. One of them is a compound that does not decompose for a long period of time at the processing temperature of rubber and yet rapidly decomposes at the vulcanization temperature to isolate carbon disulfide (hereinafter called "carbon disulfide source"), and the other is an amine or imine blocked with isocyanate or an amine-isocyanate addition compound (hereinafter called "amine source").

By adding them together with other components such as sulfur and zinc oxide into vulcanizable rubber, it has been found that the problems of scorching do not take place for a long period of time during the processing step and that vulcanization at the vulcanization temperature takes place rapidly. Further the general overall processing ability of the rubber composition is vastly improved.

In accordance with the present invention, the carbon disulfide source is a compound selected from the group consisting of cyclic bis (thiocarbamoyl) monosulfides, cyclic bis (thiocarbamoyl) disulfides, cyclic bis (thioxanthogenyl) monosulfides, cyclic bis (thioxanthogenyl) disulfides, cyclic (thiocarbamoyl-thioxanthogenyl) monosulfides, and cyclic (thiocarbamoyl-thioxanthogenyl) disulfides.

The above compounds suitable for use in the present invention can be represented by the following general formula.

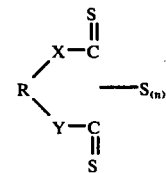

in which R represents a di-valent organic radical and more preferably alkylene, alkenylene, phenylene, alkyl substituted phenylene, halogen substituted phenylene, xylylene, alkyl substituted xylylene, halogen substituted xylylene, cyclohexylene, cyclohexylidene, alkyl substituted cyclohexylene, or alkyl substituted cyclohexylidene and X and Y represent —NH— and/or —O— when $n$ is 1, the compounds are monosulfides, i.e. >S; and when $n$ is 2, the compounds are disulfides, i.e.

Thus, when $n=1$ and X and Y are —NH—, the compounds are cyclic bis (thiocarbamoyl) monosulfides; when X and Y are —O—, the compounds are cyclic bis (thioxanthogenyl) monosulfides; and when X is —NH— and Y is —O—, the compounds are cyclic (thiocarbamoyl-thioxanthogenyl) monosulfides.

Further, when $n=2$ and X and Y are —NH—, the compounds are cyclic bis (thiocarbamoyl) disulfides; when X and Y are —O—, the compounds are cyclic bis (thioxanthogenyl) disulfides; and when X is —NH— and Y is —O—, the compounds are cyclic (thiocarbamoyl thioxanthogenyl) disulfides.

Typical examples of these compounds are: ethylene bis (thiocarbamoyl) monosulfide and disulfide, cyclohexane 1,2-bis (thiocarbamoyl) monosulfide and disulfide, phenylene-1,2-bis (thiocarbamoyl) monosulfide and disulfide, propane-1, 3-bis (thiocarbamoyl) monosulfide and disulfide, propene-bis (thiocarbamoyl) monosulfide and disulfide, phenylene-1,3-bis (thiocarbamoyl) monosulfide and disulfide, tolylene-3,4-bis (thiocarbamoyl) monosulfide and disulfide, 1,2-xylylene bis (thiocarbamoyl) monosulfide and disulfide, ethylene bis (xanthogenyl) monosulfide and disulfide, propene bis (xanthogenyl) monosulfide and disulfide, phenylene-1,2-bis (xanthogenyl) monosulfide and disulfide, ethylene-1-thiocarbamoyl-2-xanthogenyl monosulfide and disulfide, and toluene-1-xanthogenyl-2-thiocarbamoyl monosulfide and disulfide.

The other component of this invention, the amine source, is an amine including an imine blocked with isocyanate or an addition compound of a secondary amine and isocyanate produced by the following reaction:

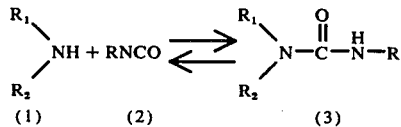

in which $R_1$ and $R_2$ are the same or different monovalent hydrocarbon radicals containing 1 to 8 carbon atoms, or together with the nitrogen atom and optionally with one or more additional heteroatoms selected from oxygen, sulphur and nitrogen represent a nonacidic heterocyclic ring, including a fused ring.

Examples of such amines are dimethylamine, diethylamine, di-n-propylamine, di-isopropylamine, di-n-butylamine, di-sec-butylamine, di-tert-butylamine, di-2-ethyl-hexylamine, N-methyl-N-cyclohexylamine, dicyclohexylamine, diphenylamine, di-tolylamine, pyridone, piperidine, piperazine, pyrrole, pyrazole, imidazole, morphorine, pyrrolidine, etc.

In the isocyanate, R is an aryl or alkyl radical having 4 to 18 carbon atoms. The aryl or alkyl radical can additionally contain an isocyanate radical or other substituent.

Examples of such isocyanates are phenyl isocyanate, p-chlorophenyl isocyanate, hexamethylene diisocyanate, octadecyl isocyanate, 2,4- and 2,6-toluene diisocyanate, di-phenylmethane-p,p'-diisocyanate, p-phenylene diisocyanate, di-chlorodiphenylmethane diisocyanate, and naphthalene-1,5-diisocyanate.

The method for producing the amine blocked with isocyanate is easily carried out. The isocyanate and amine are dissolved in suitable solvents, respectively, and mixed to produce the product. The reaction of producing this addition compound is exothermic, so a reactor equipped with a cooler is preferably used.

In the production of the amine-isocyanate addition compound, the amine releasing temperature is widely changeable by selection of the amine and isocyanate to be used.

The amine is stabilized in form (3) at the temperatures encountered in the processing step, but at vulcanization temperatures free amine is isolated which reacts with the carbon disulfide source to produce, in situ, a dithiocarbamic acid type accelerator so that vulcanization of the rubber will proceed rapidly.

The amount of the carbon disulfide source and the amine source used is adjusted to provide a molar ratio of from 0.5 to 2 and more preferably 1 mole of isolated amine to 1 mole of carbon disulfide. The amount of the carbon disulfide source added to the rubber is preferably from about 0.1 to 8 parts, and more preferably from 0.5 to 2 parts, by weight per 100 parts of rubber.

During mixing of the carbon disulfide source and the amine source into the rubber, zinc oxide, stearic acid, sulfur, fillers or other components usually used in rubber composition can be mixed in simultaneously.

Rubber to be used in the vulcanization system of this invention is rubber which is vulcanizable by a sulfur accelerator system; in other words, rubber containing an olefinically unsaturated group such as natural rubber, polyisoprene rubber, polybutadiene rubber, styrene-butadiene copolymer rubber, acrylonitrile-butadiene copolymer rubber, ethylene-propylene-diene terpolymer rubber and the like.

The invention will now be explained by reference to the following Examples, but without any intention to be limited thereby.

EXAMPLES 1–19

Rubber compositions containing accelerator systems of the present invention are prepared, as taught above by mixing in the usual manner the ingredients shown in Table I. Control rubber samples (controls 1–5) are also prepared for comparison purposes.

TABLE I

| Components | Control 1 | Control 2 | Control 3 | Control 4 | Control 5 | Example 1 | Example 2 | Example 3 | Example 4 | Example 5 | Example 6 | Example 7 | Example 8 | Example 9 |
|---|---|---|---|---|---|---|---|---|---|---|---|---|---|---|
| natural rubber | 100 | 100 | 100 | 100 | | 100 | 100 | 100 | 100 | 100 | 100 | 100 | 100 | 100 |
| styrene-butadiene copolymer (SBR-1712) | — | — | — | — | | — | — | — | — | — | — | — | — | — |
| HAF carbonblack | 50 | 50 | 50 | 50 | | 50 | 50 | 50 | 50 | 50 | 50 | 50 | 50 | 50 |
| zinc oxide | 5 | 5 | 5 | 5 | | 5 | 5 | 5 | 5 | 5 | 5 | 5 | 5 | 5 |
| stearic acid | 3 | 3 | 3 | 3 | | 3 | 3 | 3 | 3 | 3 | 3 | 3 | 3 | 3 |
| Desolex No. 1 (A) | 10 | 10 | 10 | 10 | | 10 | 10 | 10 | 10 | 10 | 10 | 10 | 10 | 10 |
| sulfur | 2 | 2 | 2 | 2 | 0 | 2 | 2 | 2 | 2 | 2 | 2 | 2 | 2 | 2 |
| N-cyclohexyl-2-benzothiazole sulfenamide | 0.8 | | | | | | | | | | | | | |
| tetramethylthiuram disulfide | | 0.4 | | | | | | | | | | | | |
| carbon disulfide source: | | | | | | | | | | | | | | |
| ethylene-bis(thiocarbamoyl) disulfide(1) | | | | | | 1.0 | | | | | | | | |
| propane-1,3-bis(thiocarbamoyl) disulfide(2) | | | | | | | 1.0 | | | | | | | |
| propylene-bis(thiocarbamoyl) disulfide(3) | | | | | | | | 1.0 | | | | | | |
| phenylene-1,2-bis(thiocarbamoyl) disulfide(4) | | | | | | | | | 1.2 | | | | | |
| tolylene-3,4-bis(thiocarbamoyl) disulfide(5) | | | | | | | | | | 1.2 | | | | |
| phenylene-1,3-bis(thiocarbamoyl) disulfide(6) | | | | | | | | | | | 1.2 | | | |

TABLE I-continued

| | | | | | | | | | | | |
|---|---|---|---|---|---|---|---|---|---|---|---|
| 1,2 xylylene-bis(thiocarbamoyl) disulfide(7) | | | | | | | | | 1.3 | | |
| cyclohexane-1,2-bis(thiocarbamoyl) disulfide(8) | | | | | | | | | | 1.2 | |
| ethylene 1-thiocarbamoyl-2-xanthogenyl disulfide(9) | | | | | | | | | | | 1.0 |
| ethylene bis (xanthogenyl) disulfide(10) | | | | | | | | | | | |
| propylene-bis (xanthogenyl) disulfide(11) | | | | | | | | | | | |
| phenylene-1-thiocarbamoyl-2-xanthogenyl disulfide(12) | | | | | | | | | | | |
| ethylene bis (thiocarbamoyl) monosulfide(13) | | | | | | | | | | | |
| phenylene 1,2-bis (thiocarbamoyl) monosulfide(14) | | | | | | | | | | | |
| ethylene bis (xanthogenyl) monosulfide(15) | | | | | | | | | | | |
| cyclohexane-1,2-bis (thiocarbamoyl) monosulfide(16) | | | | | | | | | | | |
| polythiocarbonate | — | 1.0 | — | — | | | | | | | |
| pyrrolidine/4,4'-diphenylmethanedi-isocyanate | — | 1.2 | — | — | 1.2 | 1.2 | 1.2 | 1.2 | 1.2 | 1.2 | 1.2 | 1.2 |

| Components | Example | | | | | | | | | |
|---|---|---|---|---|---|---|---|---|---|---|
| | 10 | 11 | 12 | 13 | 14 | 15 | 16 | 17 | 18 | 19 |
| natural rubber | 100 | 100 | 100 | 100 | 100 | 100 | 100 | | | |
| styrene-butadiene copolymer (SBR-1712) | — | — | — | — | — | — | — | 137.5 | 137.5 | 137.5 |
| HAF carbonblack | 50 | 50 | 50 | 50 | 50 | 50 | 50 | 70 | 70 | 70 |
| zinc oxide | 5 | 5 | 5 | 5 | 5 | 5 | 5 | 3 | 3 | 3 |
| stearic acid | 3 | 3 | 3 | 3 | 3 | 3 | 3 | 2 | 2 | 2 |
| Desolex No. 1 (A) | 10 | 10 | 10 | 10 | 10 | 10 | 10 | 8 | 8 | 8 |
| sulfur | 2 | 2 | 2 | 2 | 2 | 2 | 2 | 2 | 2 | 2 |
| N-cyclohexyl-2-benzothiazole sulfenamide | | | | | | | | | | |
| tetramethylthiuram disulfide | | | | | | | | | | |
| carbon disulfide source: | | | | | | | | | | |
| ethylene-bis(thiocarbamoyl) disulfide(1) | | | | | | | | | | |
| propane-1,3-bis(thiocarbamoyl) disulfide(2) | | | | | | | | | | |
| propylene-bis(thiocarbamoyl) disulfide(3) | | | | | | | | | | |
| phenylene-1,2-bis(thiocarbamoyl) disulfide(4) | | | | | | | | | 1.1 | |
| tolylene-3,4-bis(thiocarbamoyl) disulfide(5) | | | | | | | | | | |
| phenylene-1,3-bis(thiocarbamoyl) disulfide(6) | | | | | | | | | | |
| 1,2 xylylene-bis(thiocarbamoyl) disulfide(7) | | | | | | | | | | |
| cyclohexane-1,2-bis(thiocarbamoyl) disulfide(8) | | | | | | | | | 1.1 | |
| ethylene 1-thiocarbamoyl-2-xanthogenyl disulfide(9) | | | | | | | | | | |
| ethylene bis (xanthogenyl) disulfide(10) | 1.0 | | | | | | | | | 1.0 |
| propylene-bis (xanthogenyl) disulfide(11) | | 1.0 | | | | | | | | |
| phenylene-1-thiocarbamoyl-2-xanthogenyl disulfide(12) | | | 1.2 | | | | | | | |
| ethylene bis (thiocarbamoyl) monosulfide(13) | | | | 1.0 | | | | | | |
| phenylene 1,2-bis (thiocarbamoyl) monosulfide(14) | | | | | 1.2 | | | | | |
| ethylene bis (xanthogenyl) monosulfide(15) | | | | | | 1.0 | | | | |
| cyclohexane-1,2-bis (thiocarbamoyl) monosulfide(16) | | | | | | | 1.2 | | | |
| polythiocarbonate | | | | | | | | | | |
| pyrrolidine/4,4'-diphenylmethanedi-isocyanate | 1.2 | 1.2 | 1.2 | 1.2 | 1.2 | 1.2 | 1.2 | 1.2 | 1.2 | 1.2 |

(A) aromatic type oil manufactured by Showa Oil Company, Ltd.

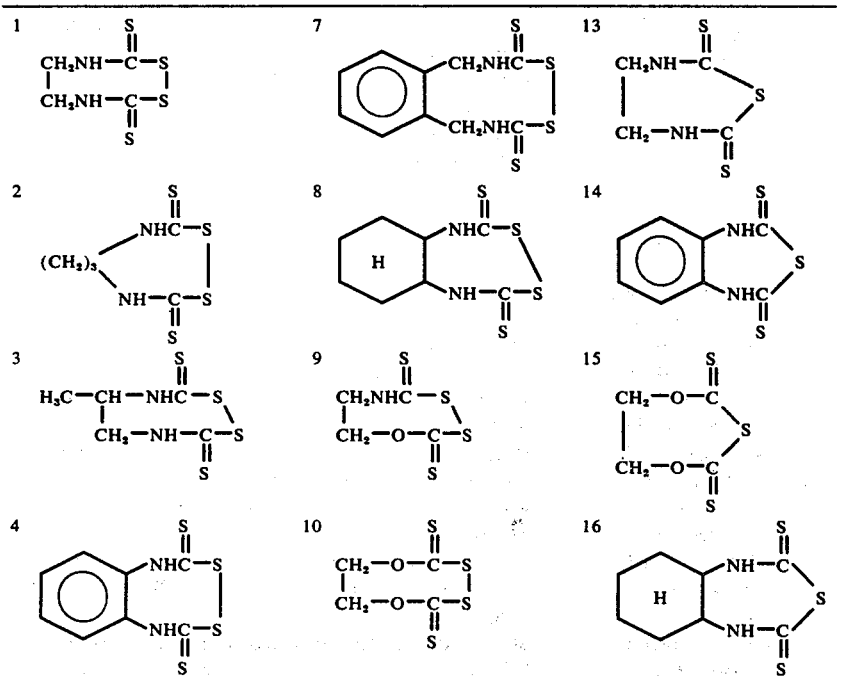

Carbon Disulfide Source of Table I

-continued

Carbon Disulfide Source of Table I

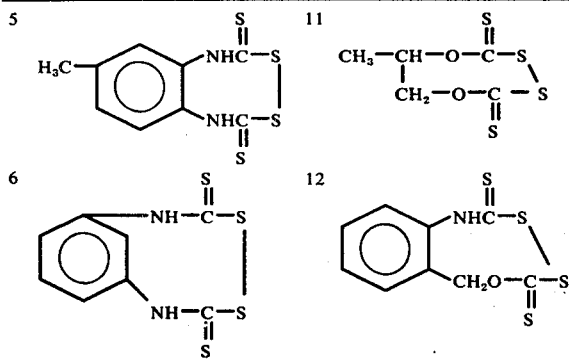

Vulcanization of the compositions is then carried out and the vulcanization characteristics of the rubber are measured using an MPV type Rheometer manufactured by The Monsanto Company. The results are shown in Table II below.

In Table II, Tc represents optimum vulcanization time in minutes or time taken to reach 95% of maximum torque and Ts represents scorch time or time taken to reach torque of just 3-inch-pounds higher than minimum torque.

TABLE II

| testing temperature characteristic | 125° C Ts | 150° C Tc | 150° C Ts | 160° C Tc | 160° C Ts |
|---|---|---|---|---|---|
| Example 1 | 40.0 | 42.5 | 3.5 | 17.5 | 1.3 |
| 2 | 42.0 | 43.3 | 3.1 | 18.3 | 1.6 |
| 3 | 43.1 | 44.7 | 3.6 | 19.2 | 1.9 |
| 4 | 21.5 | 45.5 | 3.2 | 14.8 | 1.6 |
| 5 | 25.7 | 44.2 | 2.9 | 15.7 | 1.9 |
| 6 | 27.6 | 43.3 | 3.0 | 19.4 | 1.7 |
| 7 | 38.4 | 44.5 | 3.4 | 18.2 | 1.4 |
| 8 | 35.5 | 41.6 | 3.3 | 17.7 | 1.5 |
| 9 | 60.5 | 44.0 | 3.6 | 18.2 | 1.8 |
| 10 | 45.2 | 38.7 | 2.7 | 17.0 | 2.0 |
| 11 | 44.3 | 43.4 | 3.1 | 15.6 | 2.2 |
| 12 | 36.5 | 38.2 | 2.5 | 18.2 | 2.4 |
| 13 | 44.0 | 45.3 | 3.6 | 18.4 | 1.8 |
| 14 | 38.7 | 42.1 | 2.9 | 15.5 | 1.7 |
| 15 | 42.3 | 45.7 | 3.3 | 18.2 | 1.4 |
| 16 | 38.6 | 40.2 | 3.1 | 17.6 | 1.9 |
| 17 | 55.5 | | | 25.5 | 3.1 |
| 18 | 58.3 | | | 27.7 | 3.3 |
| 19 | 60.4 | | | 30.2 | 3.4 |
| Control 1 | 24.1 | 13.2 | 4.7 | 7.4 | 2.0 |
| 2 | 7.6 | 48.0 | 1.8 | 2.7 | 0.8 |
| 3 | 36.0 | 15.7 | 2.8 | 7.9 | 1.9 |
| 4 | 78.3 | 65.0 | 7.3 | 25.5 | 3.1 |
| 5 | | testing was impossible | | | |

As is clear from the above description, the rubber compositions of this invention, containing as a vulcanization accelerator system, a carbon disulfide source selected from the group consisting of cyclic bis (thiocarbamoyl) monosulfides and disulfides, cyclic bis (thioxanthogenyl) monosulfides and disulfides and cyclic (thiocarbamoyl-thioxanthogenyl) monosulfides and disulfides, and an amine source consisting of an amine or an imine blocked with isocyanate are practically inert to chemical reaction at usual processing temperatures (below about 125° C) and their stability against scorching is excellent in comparison with known accelerators.

Moreover, when the rubber compositions are heated to the vulcanization temperature (above 160° C) to vulcanize them they are rapidly vulcanized at the same or even better rate of vulcanization as known accelerators.

Accordingly, the problems in the rubber industry of preventing scorching during the processing step while achieving vulcanization rapidly and easily during the vulcanization step are substantially met by the present invention.

What is claimed is:
1. A vulcanization accelerator system comprising:
A. at least one cyclic sulfide having the formula:

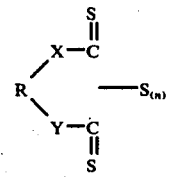

wherein R is a divalent hydrocarbon radical selected from the group consisting of alkylene, alkenylene, phenylene, alkyl substituted phenylene, halogen substituted phenylene, xylylene, alkyl substituted xylylene, halogen substituted xylylene, cyclohexylene, cyclohexylidene, alkyl substituted cyclohexylene, or alkyl substituted cyclohexylidene; X and Y are —NH— or —O—; and n is 1 or 2; and
B. an amine-isocyanate addition compound having the formula:

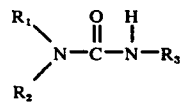

in which $R_1$ and $R_2$ are the same or different monovalent hydrocarbon radicals having 1 to 8 carbon atoms; or together with the nitrogen atom, a nonacidic heterocyclic ring, containing at least one atom selected from oxygen, sulphur and nitrogen; and $R_3$ represents a substituted or unsubstituted aryl or alkyl radical having from 4 to 18 carbon atoms.
2. A vulcanizable rubber composition comprising:
1. a rubber containing an olefinically unsaturated group;
2. at least one compound as a source of carbon disulfide selected from cyclic sulfides having the formula:

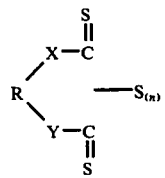

wherein R is a divalent hydrocarbon radical selected from the group consisting of alkylene, alkenylene, phenylene, alkyl substituted phenylene, halogen substituted phenylene, xylylene, alkyl substituted xylylene, halogen substituted xylylene, cyclohexylene, cyclohexylidene, alkyl substituted cyclohexylene, or alkyl substituted cyclohexylidene; X and Y are —NH— or —O—; and $n$ is 1 or 2; and 3. an amine- isocyanate addition compound having the formula:

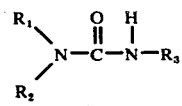

in which $R_1$ and $R_2$ are the same or different monovalent hydrocarbon radicals having 1 to 8 carbon atoms; or together with the nitrogen atom, a non-acidic heterocyclic ring, containing at least one atom selected from oxygen, sulphur and nitrogen; and $R_3$ represents a substituted or unsubstituted aryl or alkyl radical having from 4 to 18 carbon atoms.

3. The rubber composition of claim 2, in which the rubber is selected from the group consisting of natural rubber, polyisoprene rubber, polybutadiene rubber, styrene-butadiene copolymer rubber, acrylonitrile-butadiene copolymer rubber, and ethylene-propylene-diene terpolymer rubber.

4. The rubber composition of claim 2, in which the amount of the amine-isocyanate addition compound (3) to the compound (2) is from 0.5 to 1 to 2 to 1 based on the moles of isolated amine to carbon disulfide.

5. The rubber composition of claim 2, in which the amount of compound (2) is from 0.1 to 8 parts by weight per 100 parts of the rubber (1).

6. The rubber composition of claim 5, in which the amount of compound (2) is from 0.5 to 2 parts by weight per 100 parts of the rubber (1).

7. The rubber composition of claim 2, in which the carbon disulfide source (2) is ethylene-bis (thiocarbamoyl) disulfide.

8. The rubber composition of claim 2, in which the carbon disulfide source (2) is propane-1,3-bis (thiocarbamoyl) disulfide.

9. The rubber composition of claim 2, in which the carbon disulfide source (2) is propylene-bis (thiocarbamoyl) disulfide.

10. The rubber composition of claim 2, in which the carbon disulfide source (2) is phenylene-1,2-bis (thiocarbamoyl) disulfide.

11. The rubber composition of claim 2, in which the carbon disulfide source (2) is tolylene-3,4-bis (thiocarbamoyl) disulfide.

12. The rubber composition of claim 2, in which the carbon disulfide source (2) is phenylene-1,3-bis (thiocarbamoyl) disulfide.

13. The rubber composition of claim 2 in which the carbon disulfide source (2) is 1,2 xylylene-bis (thiocarbamoyl) disulfide.

14. The rubber composition of claim 2, in which the carbon disulfide source (2) is cyclohexane-1,2-bis (thiocarbamoyl) disulfide.

15. The rubber composition of claim 2, in which the carbon disulfide source (2) is ethylene 1-thiocarbamoyl-2-xanthogenyl disulfide.

16. The rubber composition of claim 2, in which the carbon disulfide source (2) is ethylene bis (xanthogenyl) disulfide.

17. The rubber composition of claim 2, in which the carbon disulfide source (2) is propylene-bis (xanthogenyl) disulfide.

18. The rubber composition of claim 2, in which the carbon disulfide source (2) is phenylene-1-thiocarbamoyl-2-xanthogenyl disulfide.

19. The rubber composition of claim 2, in which the carbon disulfide source (2) is ethylene bis (thiocarbamoyl) monosulfide.

20. The rubber composition of claim 2, in which the carbon disulfide source (2) is phenylene 1,2-bis (thiocarbamoyl) monosulfide.

21. The rubber composition of claim 2, in which the carbon disulfide source (2) is ethylene bis (xanthogenyl) monosulfide.

22. The rubber composition of claim 2, in which the carbon disulfide source (2) is cyclohexane-1,2-bis (thiocarbamoyl) monosulfide.

* * * * *